United States Patent
Williams

(10) Patent No.: US 6,725,049 B1
(45) Date of Patent: Apr. 20, 2004

(54) SYSTEM AND METHOD FOR DISSEMINATING GLOBAL POSITIONING INFORMATION THROUGH A TELECOMMUNICATIONS INFRASTRUCTURE

(75) Inventor: Marvin L. Williams, Hickory Creek, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/320,324

(22) Filed: May 26, 1999

(51) Int. Cl.[7] ................................................ H04Q 7/20
(52) U.S. Cl. .................... 455/456.1; 455/554; 455/451; 455/462; 455/457
(58) Field of Search ................................. 455/456, 465, 455/422, 457, 554, 555, 456.1–456.6, 461–463, 554.2; 342/357.13, 357.12; 701/208, 209; 379/142.01, 142.02, 142.04, 93.17

(56) References Cited

U.S. PATENT DOCUMENTS

| | | | | |
|---|---|---|---|---|
| 5,303,297 A | * | 4/1994 | Hillis | 379/111 |
| 5,388,147 A | * | 2/1995 | Grimes | 379/37 |
| 5,572,204 A | * | 11/1996 | Timm et al. | 340/988 |
| 5,712,899 A | * | 1/1998 | Pace, II | 455/456.2 |
| 5,731,757 A | * | 3/1998 | Layson, Jr. | 340/5.61 |
| 5,959,577 A | * | 9/1999 | Fan et al. | 342/357.13 |
| 5,982,325 A | * | 11/1999 | Thornton et al. | 342/357.07 |
| 6,061,573 A | * | 5/2000 | Goldberg | 455/503 |
| 6,104,815 A | * | 8/2000 | Alcorn et al. | 380/251 |
| 6,115,605 A | * | 9/2000 | Siccardo et al. | 340/7.45 |
| 6,199,045 B1 | * | 3/2001 | Giniger et al. | 340/990 |
| 6,236,360 B1 | * | 5/2001 | Rudow et al. | 340/995 |
| 6,275,773 B1 | * | 8/2001 | Lemelson et al. | 340/436 |
| 6,320,535 B1 | * | 11/2001 | Hillman et al. | 342/357.06 |
| 6,526,486 B2 | * | 2/2003 | Theimer | 711/159 |
| 6,529,824 B1 | * | 3/2003 | Obradovich et al. | 701/208 |
| 6,560,461 B1 | * | 5/2003 | Fomukong et al. | 455/456 |
| 2002/0151305 A1 | * | 10/2002 | Ward et al. | 455/436 |

FOREIGN PATENT DOCUMENTS

JP 409184878 A * 7/1997 ............. G01S/5/14

* cited by examiner

*Primary Examiner*—Nay Maung
*Assistant Examiner*—Edan Orgad

(57) ABSTRACT

A system for, and method of, disseminating global positioning information through a telecommunications network. In one embodiment, the system includes: (1) a receiver that collects global positioning signals and generates global positioning information based thereon and (2) a mixer, coupled to the receiver, that combines the global positioning information with user traffic to allow the global positioning information to be communicated with the user traffic through the telecommunications network to a recipient.

21 Claims, 2 Drawing Sheets

SYSTEM AND METHOD FOR DISSEMINATING GLOBAL POSITIONING INFORMATION THROUGH A TELECOMMUNICATIONS INFRASTRUCTURE

TECHNICAL FIELD OF THE INVENTION

The present invention is directed, in general, to telecommunications and, more specifically, to a system and method for disseminating global positioning information through a telecommunications infrastructure.

BACKGROUND OF THE INVENTION

Telephone call recipients have become increasingly more interested in the origin of their incoming calls. Much of this interest is a desire to screen incoming calls to save time during normally busy times. Additionally, with the rapid growth of the telemarketing industry, telephone call recipients do not want to be bothered with a plethora of sales calls from uninvited salespeople.

Answering machines and other voice mail mechanisms currently allow telephone call recipients to screen their calls and also allow them to capture important messages and information that may otherwise be lost. Current caller-ID services allow telephone call recipients another degree of freedom in that they may identify and capture both the name and telephone number of a caller, under certain conditions, as the telephone call originates. This caller-ID information is preprogrammed and based on a caller database of pre-associated data that does not convey any other information. Another problem with conventional caller-ID is that calls placed from private branch exchanges do not convey extension numbers, so that telephone calls from these callers may not be identified directly.

Mobile callers may wish to communicate with a telephone call recipient to obtain travel directions to the recipient's location or to convey estimates of arrival time. If the mobile caller is "lost," a complicated communication may ensue that causes added stress to the situation. Additionally, telephone call recipients may need to know the location of a caller under certain important circumstances. Current caller-ID or voice-mail does not provide verifiable location information.

Accordingly, what is needed in the art is a way to obtain both caller and telephone call recipient location information through a telecommunications network.

SUMMARY OF THE INVENTION

To address the above-discussed deficiencies of the prior art, the present invention provides a system for, and method of, disseminating global positioning information through a telecommunications network. In one embodiment, the system includes: (1) a receiver that collects global positioning signals and generates global positioning information based thereon and (2) a mixer, coupled to the receiver, that combines the global positioning information with user traffic to allow the global positioning information to be communicated with the user traffic through the telecommunications network to a recipient.

The present invention therefore introduces the broad concept of injecting global positioning information into telecommunications between calling and called parties. The global positioning information can be employed to allow one party to determine the location, or confirm the identity, of the other, to form the basis for encryption of messages or conversations between the parties or for any other purpose that the parties deem advantageous. The positioning information can be communicated isochronously with the user traffic. For purposes of the present invention, "isochronous" is defined as communication in which timing is required to be successful. Conventionally, voice and digital video are required to be transmitted isochronously.

In one embodiment of the present invention, the mixer employs in-band signaling to combine the global positioning information with the user traffic. Alternatively, the mixer may inject the global positioning information into an out-of-band channel associated with the user traffic. Those skilled in the pertinent art will recognize that it is merely necessary to associate the global positioning information in some way with the user traffic.

In one embodiment of the present invention, the receiver and the mixer are located without a telephone. Alternatively, the receiver, the mixer and, if present, a display can be integrated with a telephone. The present invention is not limited to a particular physical arrangement.

In one embodiment of the present invention, the global positioning information and the user traffic are routed through a private branch exchange (PBX) before being communicated to the recipient. Alternatively, the global positioning information and the user traffic can be routed directly to a switch in the telecommunications network.

In one embodiment of the present invention, the system further includes a display, coupled to the receiver, that displays at least a portion of the global positioning information. The display, while not necessary to the present invention, may be of any conventional or later-discovered type.

In one embodiment of the present invention, the recipient employs the global positioning information as an encryption key. The use of global positioning information for purposes of encryption is set out more fully in copending U.S. Application No. [Attorney Docket No. WILLIAMS 5], entitled "System and Method for Location-dependent Message Access and Telecommunications Infrastructure Incorporating the Same," commonly assigned with the present invention and incorporated herein by reference.

In one embodiment of the present invention, the telecommunications network is a wireline telecommunications network. Alternatively, the telecommunications network can be a wireless telecommunications network or a computer network, such as the Internet.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
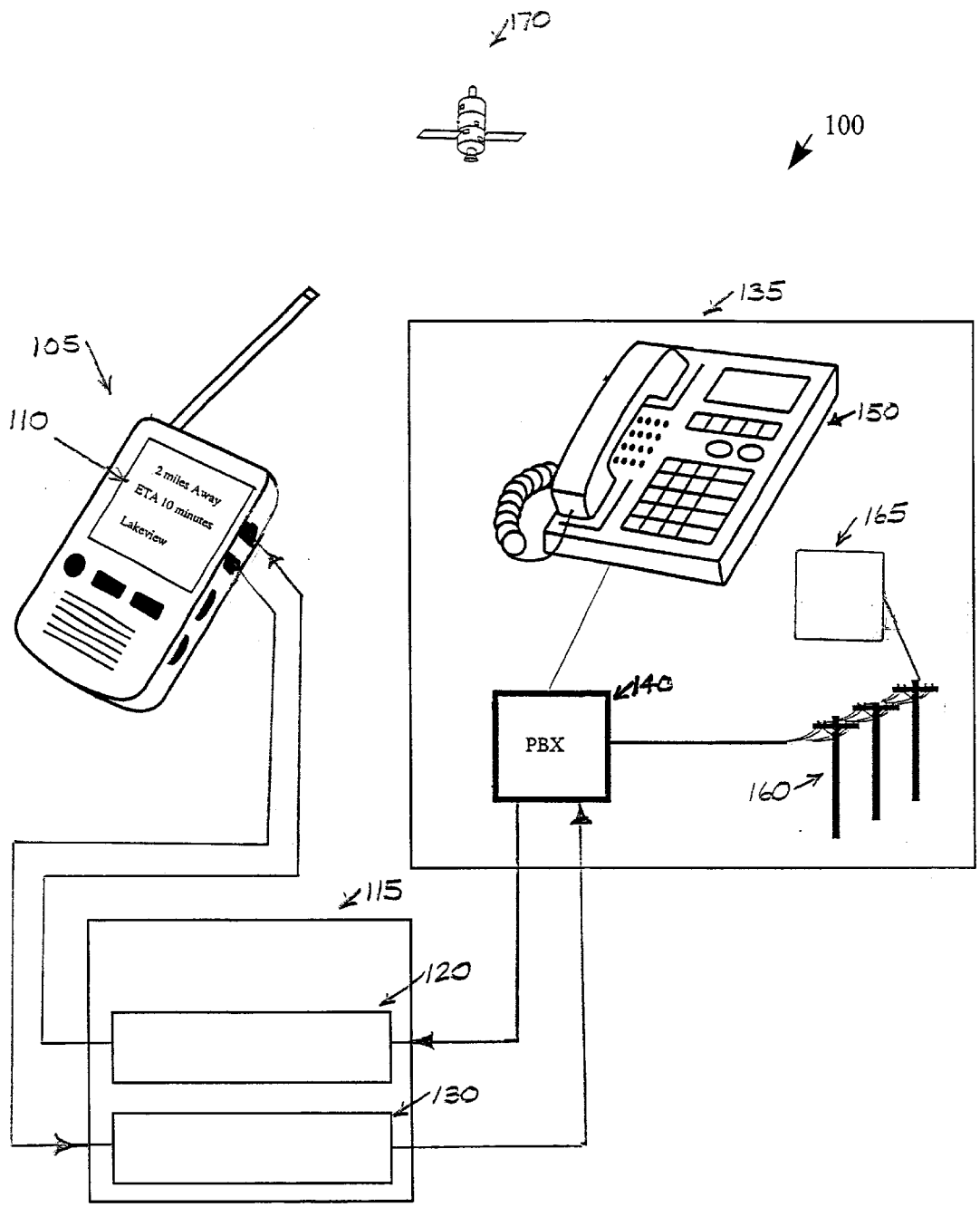
FIG. 1 illustrates a diagram for an embodiment of a system for disseminating global positioning information through a telecommunications network constructed according to principles of the present invention.

Referring initially to FIG. 1, illustrated is a diagram of an embodiment of a system 100 for disseminating global positioning information through a telecommunications network constructed according to principles of the present invention. The system 100 includes a receiver 105 having a display 110, a mixer 115 having an inbound port 120 and an outbound port 130, a telecommunications network 135 coupled to a private branch exchange (PBX) 140, a user telephone 150, a wireline distribution network 160 interconnecting a plurality of telephones 165 and a global satellite positioning system 170 employing at least three satellites.

The present invention provides both a system for and a method of disseminating global positioning information through the telecommunications network 135. In the present embodiment, the receiver 105 collects global positioning signals from the global positioning satellite 170, which is part of a global positioning system that generates global positioning information. The mixer 115, which is coupled to the receiver 105, then combines the global positioning information with user traffic from the user telephone 150. This combining allows the global positioning information to be communicated isochronously (in the illustrated embodiment) with the user traffic through the telecommunications network 135 to a recipient who is also in the telecommunications network 135.

The present invention therefore introduces the broad concept of injecting global positioning information into telecommunications between calling and called parties. The global positioning information can be employed to allow one party to determine the location or confirm the identity of the other party. The global positioning information may also form the basis for encryption of messages or conversations between the parties or may be used for any other purpose that the parties deem advantageous.

In the present embodiment, the mixer 115 employs in-band signaling to combine the global positioning information with the user traffic. Alternatively, the mixer 115 may inject the global positioning information into an out-of-band channel associated with the user traffic. Those skilled in the pertinent art will recognize that it is merely necessary to associate the global positioning information in some way with the user traffic. The receiver 105 and the mixer 115 are shown in FIG. 1 to be located without (i.e., separate from) the telephone 150. Alternatively, the receiver 105, the display 110 and the mixer 115 can be integrated with the user telephone 150. The present invention is not limited to a particular physical arrangement.

The global positioning information and the user traffic are routed through the PBX 140 before being communicated to the recipient. Alternatively, the global positioning information and the user traffic can be routed directly to another area such as a switch in the telecommunications network 135.

The display 110, in the illustrated embodiment, is used to display at least a portion of the global positioning information. The display 110 shows that the global positioning information has been used as the basis for displaying distance from a destination and an estimated time of arrival (ETA). This displayed information uses global positioning information from the recipient along with the user's global positioning information to determine the displayed information. The present embodiment also allows the user and the recipient to converse about driving directions and conditions or other subjects as needed. The display 110, while not necessary to the present invention, may be of any conventional or later-discovered type.

The recipient may also employ the global positioning information as an encryption key. The use of global positioning information for purposes of encryption is set out more fully in copending U.S. Application No. [Attorney Docket No. WILLIAMS 5], entitled "System and Method for Location-dependent Message Access and Telecommunications Infrastructure Incorporating the Same," commonly assigned with the present invention and incorporated herein by reference.

In the present embodiment, the telecommunications network 135 employs the wireline distribution network 160 to interconnect the plurality of telephones 165. Alternatively, the telecommunications network 135 can be a wireless telecommunications network or a computer network, such as the Internet. Of course, any current or future network suitable for telecommunications may be used and falls within the broad context of the present invention.

Figure 2:
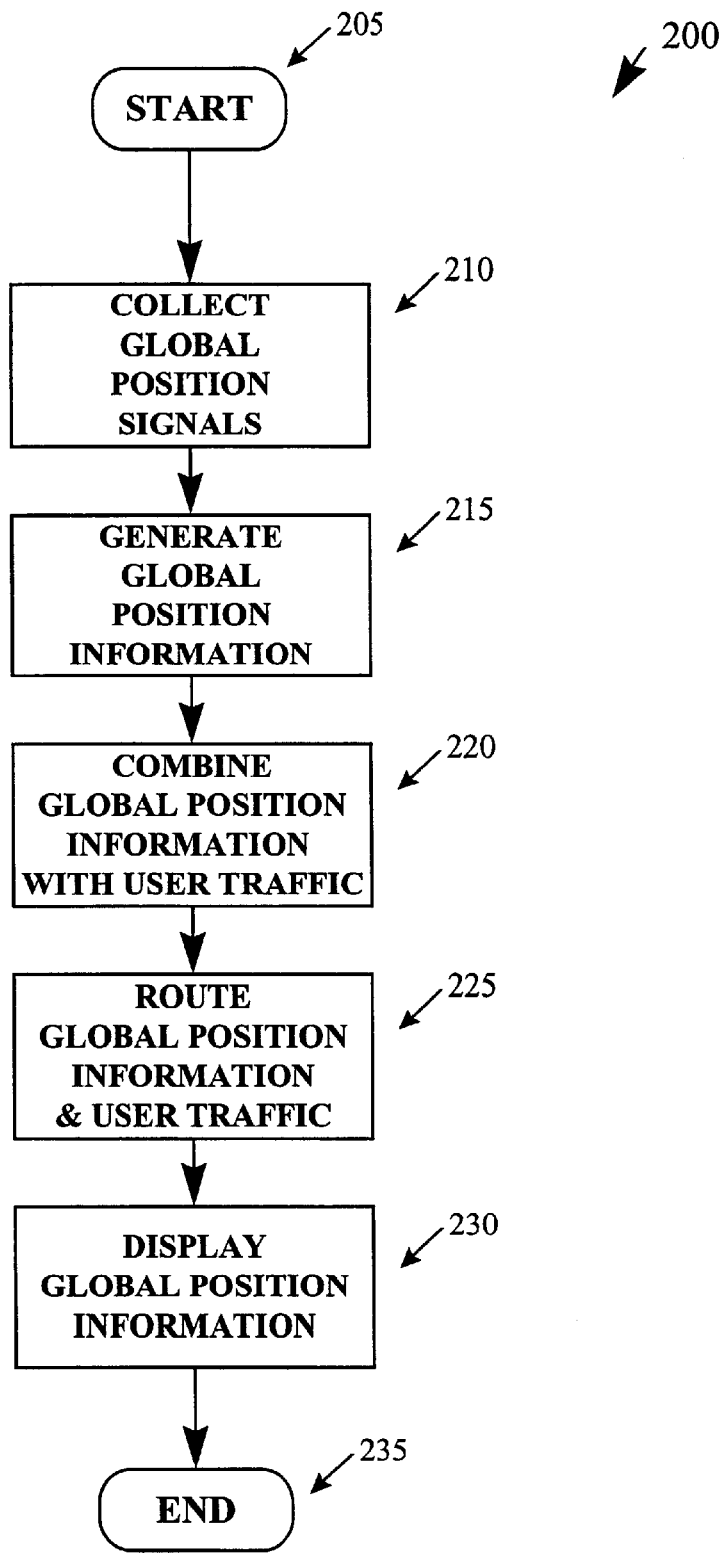
FIG. 2 illustrates a flow diagram showing a method of disseminating global positioning information through a telecommunications network.

Turning now to FIG. 2, illustrated is a flow diagram showing a method 200 of disseminating global positioning information through a telecommunications network. The method 200 begins in a step 205 when a user wishes to communicate global positioning information to a recipient. A global positioning signal is collected in a step 210 and global positioning information is then generated in a step 215. The global positioning information generated in the step 215 is then combined with user traffic in a step 220. The combined global positioning information and user traffic from the step 220 is then routed through a PBX or other appropriate telecommunications network equipment in a step 225. Finally, the global positioning information is displayed in a step 230. Alternately, the global positioning information could be used as an encryption key. The method ends in a step 235.

In summary, the present invention may be used advantageously by mobile telephone users to combine real-time global positioning information regarding their location with voice or other data to communicate with a recipient. This combination may be used to provide information about differences in the locations of the user and the recipient. Additionally, the global positioning information may also be used as an encryption key that adds a level of security to the communication. The present invention also allows data bases to be dynamically built for a user based on existing telephone conversations, which may provide distance, speed, direction or other information. Other present or future pertinent applications are well within the broad scope of the present invention.

Although the present invention has been described in detail, those skilled in the art should understand that they can make various changes, substitutions and alterations herein without departing from the spirit and scope of the invention in its broadest form.

What is claimed is:

1. A system for disseminating global positioning information through a telecommunications network, comprising:
   a receiver that collects global positioning signals and generates global positioning information based thereon; and
   a mixer, coupled to said receiver, that combines said global positioning information with user traffic between a caller and a call recipient to allow said global positioning information to be communicated with said user traffic through said telecommunications network to said recipient, wherein said recipient employs said global positioning information to confirm an identity of said caller.

2. The system as recited in claim 1 wherein said mixer combines said global positioning information with said user traffic by employing a signal selected from the group consisting of:
   an out-of-band channel associated with said user traffic, and
   an in-band signal associated with said user traffic.

3. The system as recited in claim 1 wherein said receiver and said mixer are located without a telephone.

4. The system as recited in claim 1 wherein said global positioning information and said user traffic are routed through a private branch exchange (PBX) before being communicated to said recipient.

5. The system as recited in claim 1 further comprising a display, coupled to said receiver, that displays at least a portion of said global positioning information.

6. The system as recited in claim 1 wherein said recipient employs said global positioning information as an encryption key.

7. The system as recited in claim 1 wherein said telecommunications network is a wireline telecommunications network.

8. A method of disseminating global positioning information through a telecommunications network, comprising:
   collecting global positioning signals;
   generating global positioning information based thereon;
   combining said global positioning information with user traffic between a caller and a call recipient to allow said global positioning information to be communicated with said user traffic through said telecommunications network to said recipient; and
   employing said global positioning information to confirm an identity of said caller.

9. The method as recited in claim 8 wherein said combining comprises employing a signal selected from the group consisting of:
   an out-of-band channel associated with said user traffic, and
   an in-band signal associated with said user traffic.

10. The method as recited in claim 8 wherein said collecting, generating and combining are carried out without a telephone.

11. The method as recited in claim 8 further comprising:
    routing said global positioning information and said user traffic are through a private branch exchange (PBX); and subsequently communicating said global positioning information and said user traffic to said recipient.

12. The method as recited in claim 8 further comprising displaying at least a portion of said global positioning information.

13. The method as recited in claim 8 further comprising employing said global positioning information as an encryption key.

14. The method as recited in claim 8 wherein said telecommunications network is a wireline telecommunications network.

15. A telecommunications infrastructure, comprising:
    a telecommunications network; and
    a plurality of telephones couplable to said telecommunications network, each of said plurality of telephones being associated with:
       a receiver that collects global positioning signals and generates global positioning information based thereon, and
       a mixer, coupled to said receiver, that combines said global positioning information with user traffic between a caller and a call recipient and communicates said global positioning information with said user traffic through said telecommunications network to said recipient, wherein said recipient employs said global positioning information to confirm an identity of said caller.

16. The infrastructure as recited in claim 15 wherein said mixer combines said global positioning information with said user traffic by employing a signal selected from the group consisting of:
    an out-of-band channel associated with said user traffic, and
    an in-band signal associated with said user traffic.

17. The infrastructure as recited in claim 15 wherein said receiver and said mixer are located without said plurality of telephones.

18. The infrastructure as recited in claim 15 further comprising a private branch exchange interposed between at least some of said plurality of telephones and said telecommunications network.

19. The infrastructure as recited in claim 15 wherein said plurality of telephones are further associated with a display, coupled to said receiver, that displays at least a portion of said global positioning information.

20. The infrastructure as recited in claim 15 wherein said recipient employs said global positioning information as an encryption key.

21. The infrastructure as recited in claim 15 wherein said telecommunications network is a wireline telecommunications network.

* * * * *